US007614605B2

(12) United States Patent
Chen et al.

(10) Patent No.: US 7,614,605 B2

(45) Date of Patent: Nov. 10, 2009

(54) UNIVERSAL CONNECTOR FOR A PNEUMATIC TOOL WITH UNLOCKING BY AIR FLOW

(76) Inventors: Hsiu-Ju Chen, No. 46-4, Yongchun Rd., Nantun District, Taichung City (TW); Chiu-Sheng Lin, No. 41, Sec. 2, Toujhang Rd., Tanzih Township, Taichung County (TW)

( * ) Notice: Subject to any disclaimer, the term of this patent is extended or adjusted under 35 U.S.C. 154(b) by 403 days.

(21) Appl. No.: 11/695,571

(22) Filed: Apr. 2, 2007

(65) Prior Publication Data

US 2008/0238092 A1 Oct. 2, 2008

(51) Int. Cl.
*F16K 51/00* (2006.01)
*F16L 29/00* (2006.01)

(52) U.S. Cl. ........................ 251/148; 173/169; 285/417

(58) Field of Classification Search ................. 251/142, 251/148; 173/168, 169; 285/1, 272, 417
See application file for complete search history.

(56) References Cited

U.S. PATENT DOCUMENTS

| | | | | |
|---|---|---|---|---|
| 2,607,559 | A * | 8/1952 | Forss | 251/321 |
| 4,834,131 | A * | 5/1989 | Austin | 137/115.26 |
| 7,347,407 | B2 * | 3/2008 | Chen | 251/208 |
| 7,373,992 | B2 * | 5/2008 | Sterling et al. | 173/169 |

* cited by examiner

*Primary Examiner*—John K Fristoe, Jr.
(74) *Attorney, Agent, or Firm*—Egbert Law Offices PLLC

(57) ABSTRACT

The present invention provides a universal connector for a pneumatic tool with unlocking by air flow. A directional locating member is mounted between the sleeve and the first coupler, or the pin-joint member, so the sleeve can be securely locked when located at the first position. Available at first and second positions, the second coupler of the universal connector can be positioned in the absence of aeration, or reset automatically after aeration, thus achieving unlocked by air flow purpose. This ability provides easier and convenient assembly or disassembly of the universal connector and pneumatic tool without needing any controlling members, thus guaranteeing improved ease-of-operation and higher applicability.

9 Claims, 13 Drawing Sheets

UNIVERSAL CONNECTOR FOR A PNEUMATIC TOOL WITH UNLOCKING BY AIR FLOW

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a universal connector, and more particularly to an innovative connector which is assembled between a pneumatic tool and pneumatic tube.

2. Description of Related Art Including Information Disclosed Under 37 CFR 1.97 and 37 CFR 1.98

As the pneumatic tool and pneumatic tube are typically linked through male and female connectors, the pneumatic tube may be distorted, affecting air supply and control of the pneumatic tool, if the angle and position of pneumatic tool are changed. For this reason, a universal connector or a multi-turn connector structure is developed accordingly.

The pneumatic tool is currently available with many types of universal connectors, such as those disclosed in Taiwanese Patent No. M268147, entitled "Adjustable and multi-turn connector set", Taiwanese Patent No. M290958, entitled, "Adjustable and multi-turn connector set", U.S. Pat. Nos. 4,823,835, 5,636,877, and 4,362,324. As for the structure of such universal connectors, two couplers are linked by a pin-joint member. The pin-joint member and the first coupler are mated to form a first axial portion, while the pin-joint member and the second coupler are mated to form a second axial portion, thus providing two axially-rotated members for the universal connector.

There still exist disadvantages for the structure of such prior art universal connectors.

As universal connectors and pneumatic tools (e.g. pneumatic screwdrivers, pneumatic nailers and pneumatic grinding machines) are assembled or disassembled to meet the requirements of the operating environment, the convenient and smooth assembly or disassembly is of utmost importance. However, the operator must hold the pneumatic tool with one hand, and hold the universal connector with the other hand. Moreover, the universal connector and pneumatic tool are often screwed tightly for positioning purposes. Owing to the fact that the typical universal connector is designed with two flexible portions, simultaneous manual operation shall be required to ensure smooth assembly of the universal connector and pneumatic tool, leading to poorer applicability for assembly or disassembly of the universal connector and pneumatic tool.

Thus, to overcome the aforementioned problems of the prior art, it would be an advancement in the art to provide an improved structure that can significantly improve efficacy.

To this end, the inventor has provided the present invention of practicability after deliberate design and evaluation based on years of experience in the production, development and design of related products.

BRIEF SUMMARY OF THE INVENTION

When the sleeve of the universal connector is located at the first position, the rotational action is securely locked, but when air is guided to the universal connector, rotational shift may occur to release the secure position. The advantage is that, in the absence of aeration, the second coupler can be positioned for easier manual holding and convenient assembly or disassembly of the universal connector and pneumatic tool. The securely locked position can be released automatically after aeration, without needing any controlling members, thus providing an improved ease-of-operation and higher applicability.

Based upon another technical feature, the first coupler of the universal connector is provided with a hold tank to accommodate a pressure-regulating set, such that the air flow rate can be adjusted flexibly. The pressure-regulating set is assembled onto the first coupler. When the universal connector is put into operation, the first coupler is assembled fixedly onto the pneumatic tool, ensuring more stable and convenient pressure regulation.

Based upon another technical feature, the universal connector contains an elastic restoring member. The sleeve of the second coupler can be automatically reset from the first position to the second position when air pressure is released.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

The features and the advantages of the present invention will be more readily understood upon a thoughtful deliberation of the following detailed description of a preferred embodiment of the present invention with reference to the accompanying drawings.

Figure 1:
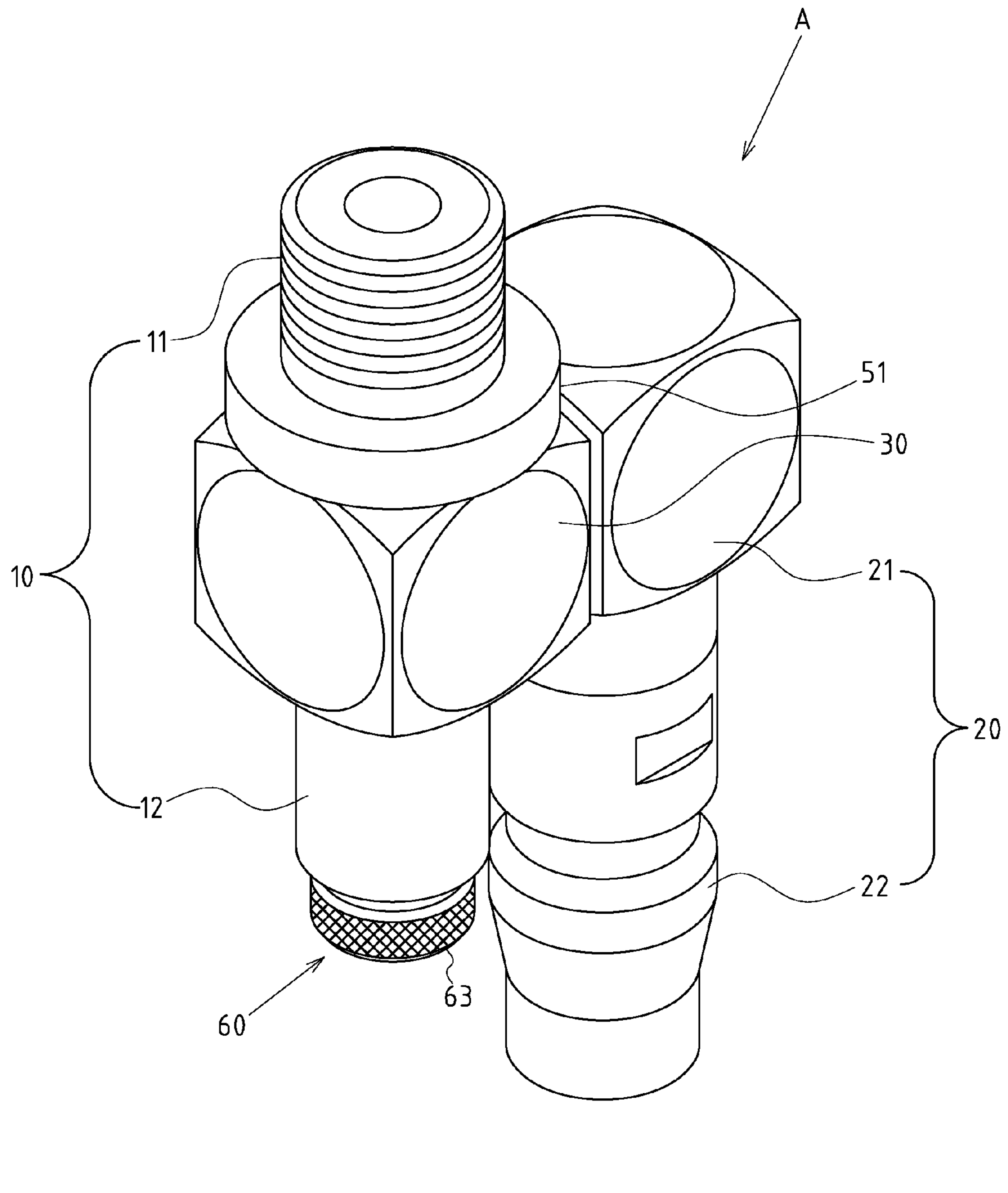
FIG. 1 shows an assembled perspective view of the preferred embodiment of the present invention.
Figure 2:
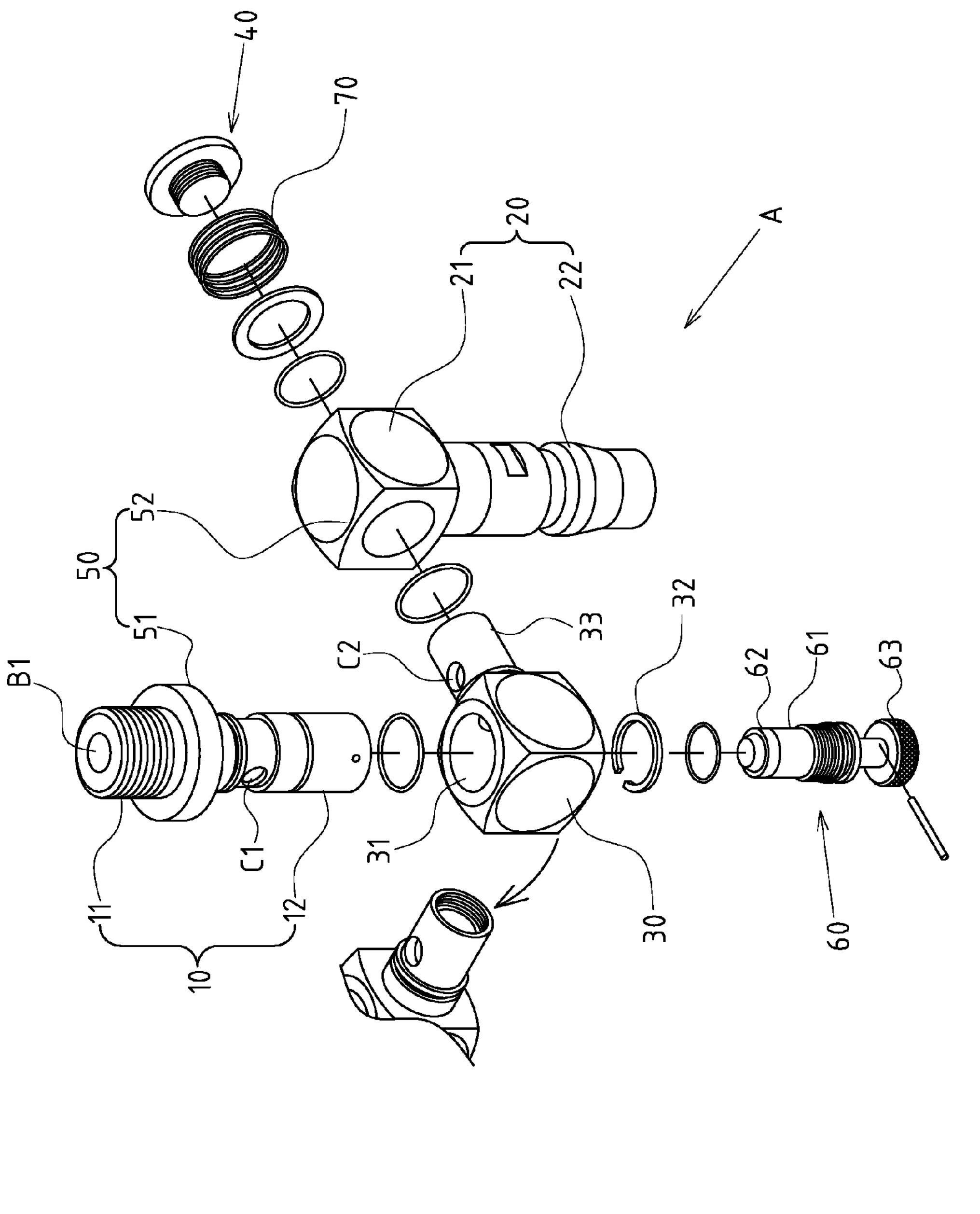
FIG. 2 shows an exploded perspective view of the preferred embodiment of the present invention.
Figure 3:
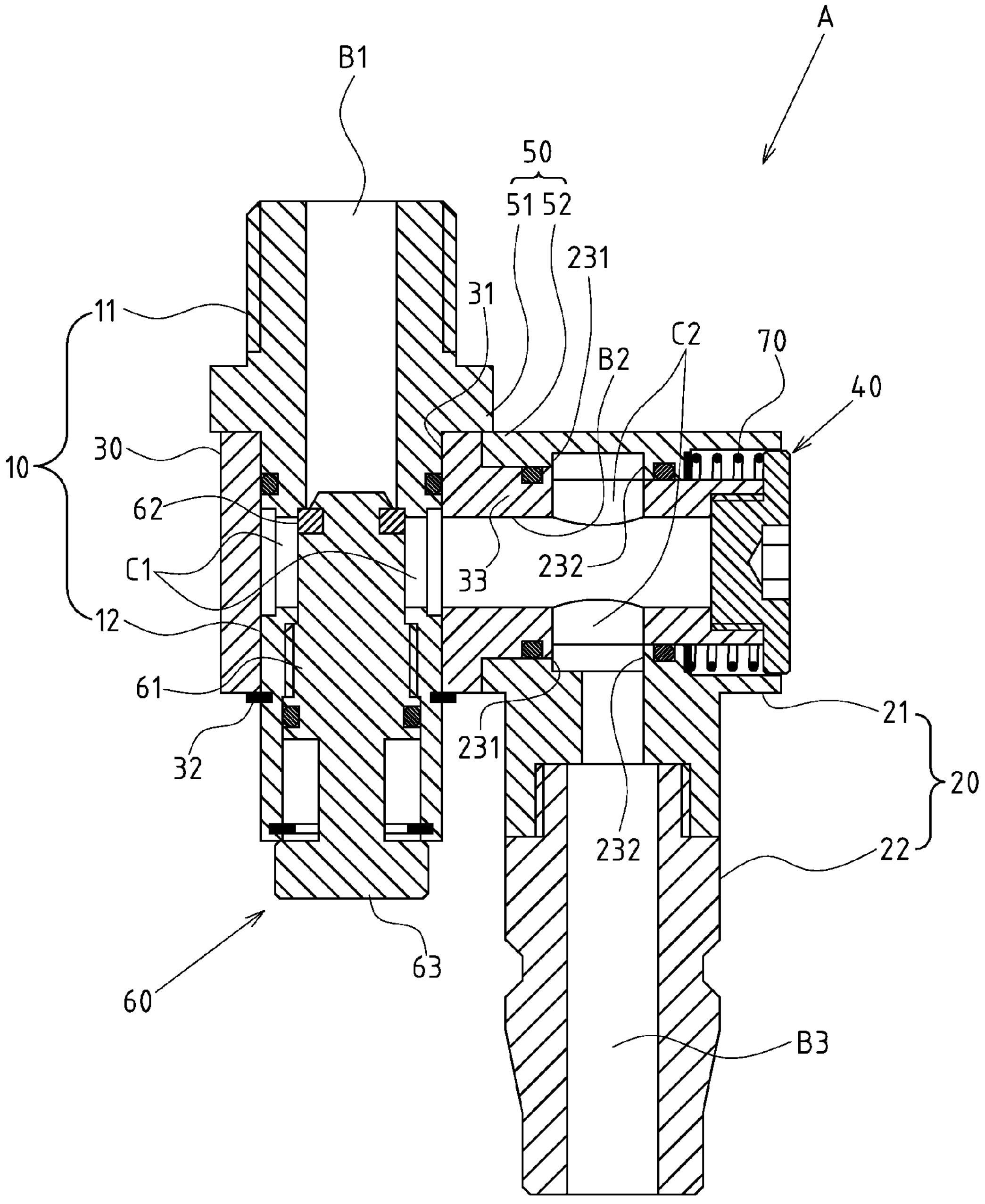
FIG. 3 shows an assembled sectional view of the preferred embodiment of the present invention.

FIGS. 1, 2 and 3 depict preferred embodiments of improved universal connector for a pneumatic tool with unlocking by air flow. The embodiments are provided only for explanatory purposes.

The universal connector A mainly comprises a first coupler 10, a pin-joint member 30, and a second coupler 20.

The hollow first coupler 10 comprises a pneumatic coupling end 11, which may be formed by a protruding tube, an extension end 12 opposite to the pneumatic coupling end 11, first flow passage B1 within the first coupler 10, and a first air hole C1 linked to the first flow passage B1 set on the wall of the extension end 12.

The pin-joint member 30 has one end provided with a through-hole 31 to be screwed onto extension end 12 of the first coupler 10. A locating element 32 is employed to limit the screwing position of through-hole 31 and the extension end 12. A protruding tube 33 is arranged at one side of the pin-joint member 30, and a second flow passage B2 is formed within the protruding tube. One end of the second flow passage is linked to the through-hole 31, and then to the first air hole C1 of extension end 12 of the first coupler 10. A second air hole C2 linked to the second flow passage B2 is set on the wall of the protruding tube 33.

The second coupler 20 has one end comprised of a sleeve 21 to be screwed into the protruding tube 33 of the pin-joint member 30. A positioning member 40, as an expanded cover mounted at the end of the protruding tube 33, is employed to limit the relative position of the sleeve 21 and the protruding tube 33. The other end of the second coupler 20 is provided with coupling portion 22, wherein a third flow passage B3 is formed. One end of the third flow passage is linked to the sleeve 21, and then to second air hole C2 of protruding tube 33 of pin-joint member 30.

The sleeve 21 of the second coupler 20 shifts along a predefined path of the protruding tube 33 of pin-joint member 30, thus forming flexibly the first and second positions. The sleeve 21 is provided with a pneumatic pusher 23, such that the sleeve 21 is driven to shift from the first position to the second position. The pneumatic pusher 23 of the preferred embodiment is non-isometric radial ring surfaces 231, 232 formed on the inner wall of the sleeve.

A directional locating member 50 securely locks the connector by limiting the rotation of sleeve 21 as it is located at the first position. The directional locating member 50 is mounted between the sleeve 21 and first coupler 10, or the pin-joint member 30. The directional locating member 50 of the preferred embodiment is comprised of a flanged portion 51 on the first coupler 10 and a flush portion 52 opposite to the sleeve 21 of the second coupler 20. Referring to FIG. 3, when the sleeve 21 is located at the first position, the rotational behavior is securely locked, if the flanged portion 51 of the first coupler 10 is pressed on the flush portion 52 of the sleeve 21.

A hold tank 13 is placed within extension end 12 of the first coupler 10 far away from the pneumatic coupling end 11. In the hold tank 13, there is a pressure-regulating set 60, which comprises a movable main body 61. One end of the main body is provided with a sealing portion 62 to control the switching and flow rate between the first flow passage B1 and the first air hole C1. The other end of main body 61 is provided with a controlling portion 63 protruding from the extension end 12, which can be formed by a knob to control the shift of main body 61.

Furthermore, the universal connector contains an elastic restoring member 70, optionally formed by a spring, which enables the sleeve 21 of second coupler 20 to be reset automatically from the second position to the first position when air pressure is released.

Based upon above-specified structures, the present invention is operates as follows.

Figure 4:
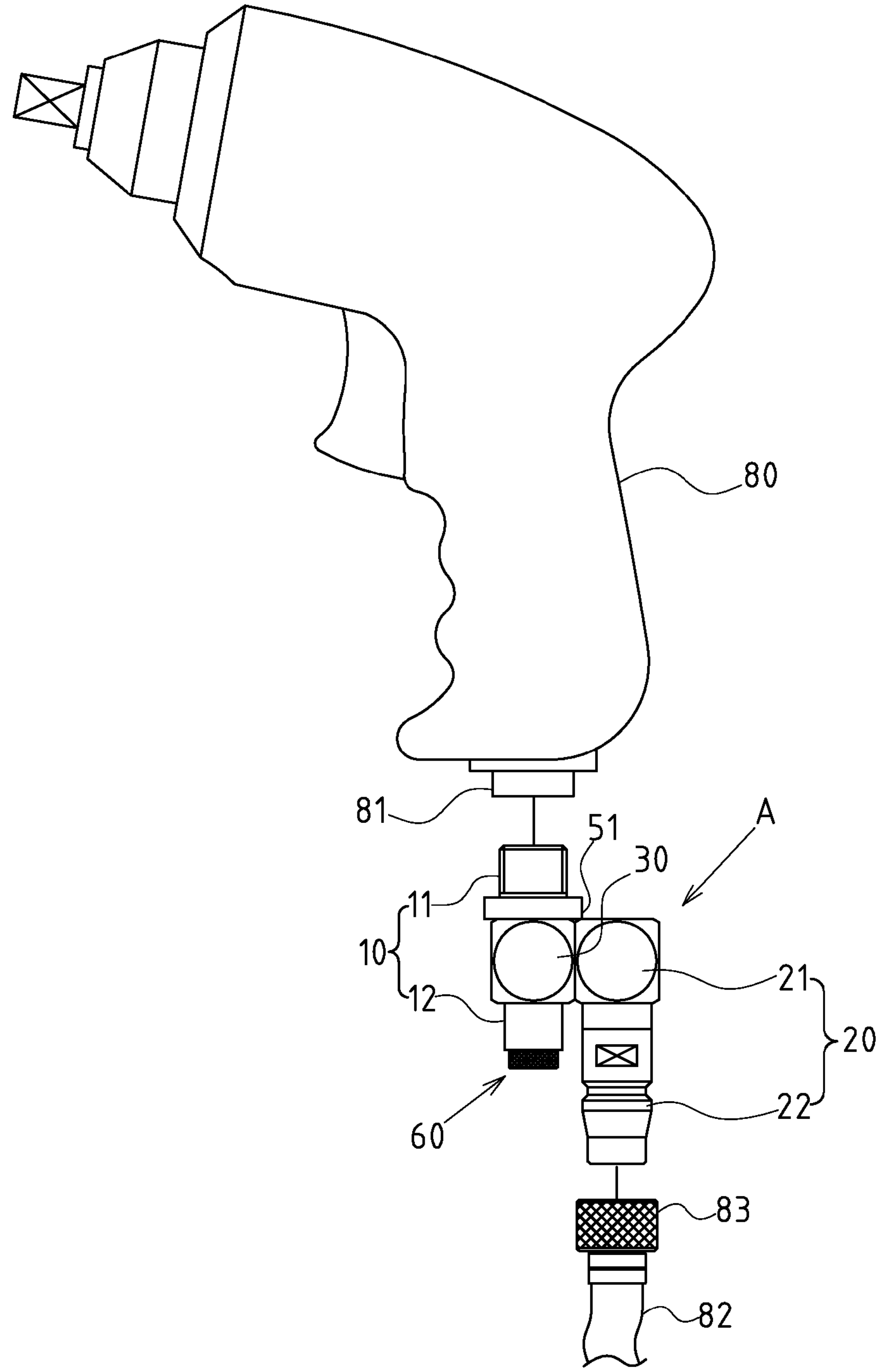
FIG. 4 shows a schematic view of the assembly of the universal connector and pneumatic tool of the present invention.
Figure 6:
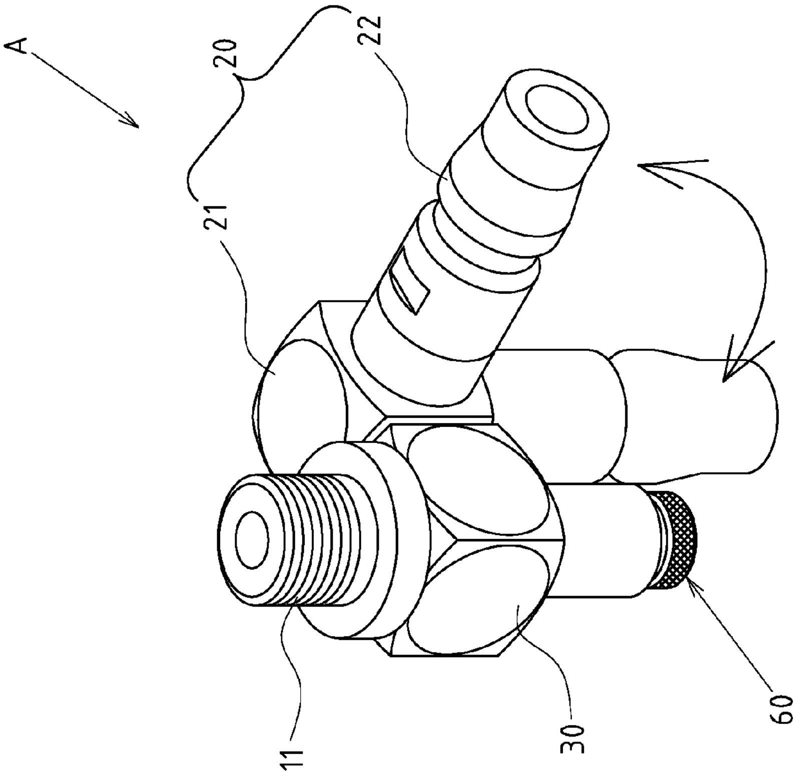
FIG. 6 shows another rotated perspective view of the universal connector of the present invention.
Figure 5:
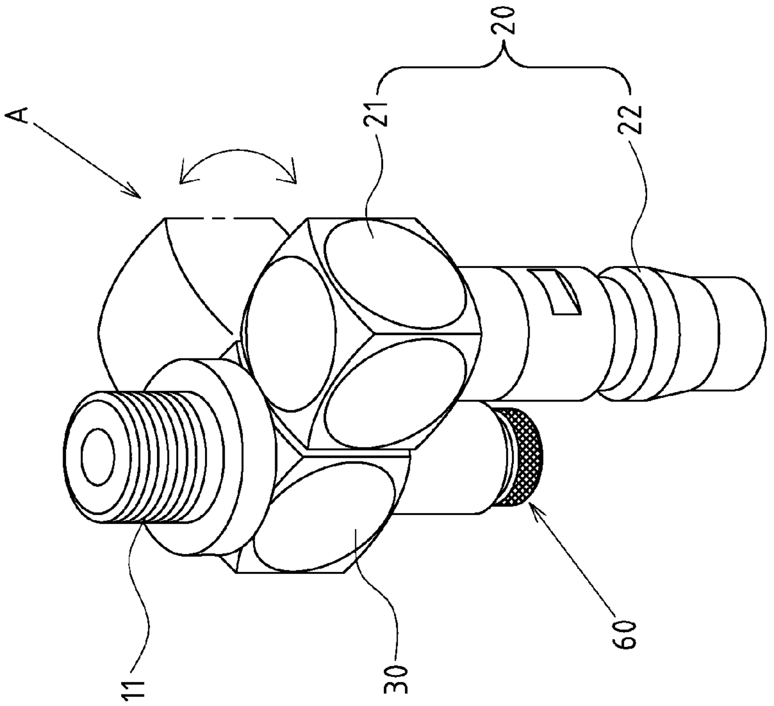
FIG. 5 shows a rotated perspective view of the universal connector of the present invention.

Referring to FIG. 4, the universal connector A of the present invention allows the pneumatic coupling end 11 of the first coupler 10 to be assembled into a preset inlet 81 of pneumatic tool 80 (e.g. pneumatic screwdrivers, pneumatic nailers and pneumatic grinding machines). The coupling portion 22 of the second coupler 20 is mated with the connector 83 of pneumatic tube 82. Referring also to FIG. 5, the second coupler 20 of the universal connector A may rotate axially as the first part, while the pin-joint member 30 and the second coupler 20 may rotate axially as the second part, as shown in FIG. 6, thus providing a more flexible assembly state of the pneumatic tool and pneumatic tube.

Figure 7:
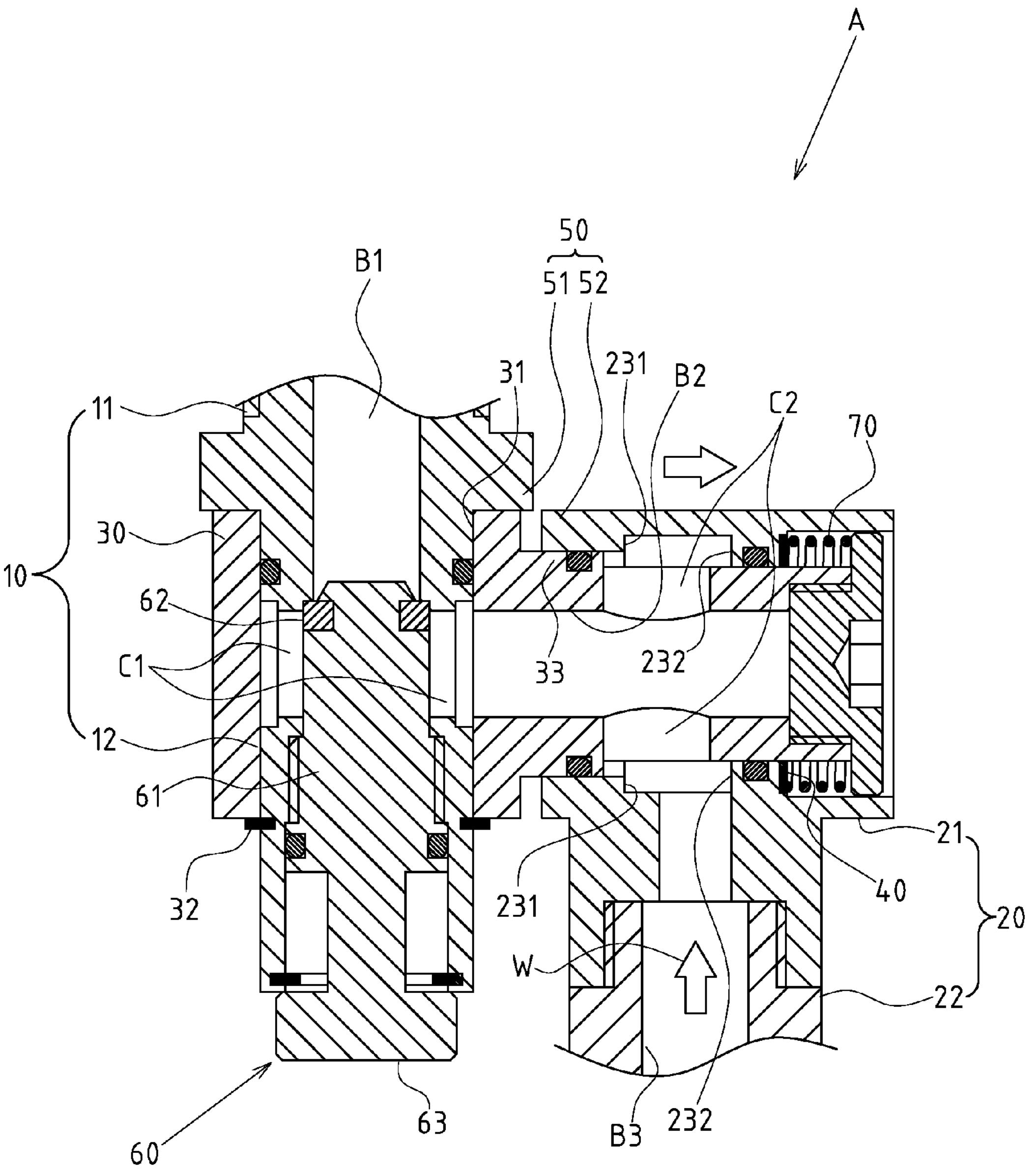
FIG. 7 shows a sectional view of the operation of the preferred embodiment of the present invention.

Referring to FIG. 7, when air pressure W is guided into the third flow passage B3 of coupling portion 22 of the second coupler 20, air pressure W may flow from the second air hole C2 into the second flow passage B2 of pin-joint member. Given that said pneumatic pusher 23 comprises non-isometric radial ring surfaces 231, 232 at inner wall of the sleeve 21, and the cross section of right-hand radial ring surface 232 is bigger than that of left-hand radial ring surface 231, along with a movable sleeve 21 of the second coupler 20, bigger air pressure W could be applied to the radial ring surface 232, making the sleeve 21 shift rightwards. In such a case, the inner elastic restoring member 70 is pressed to accumulate restoring force, so the flanged portion 51 of directional locating member 50 is separated from the flush portion 52, allowing the second coupler 20 to rotate freely. Conversely, when air pressure is released (e.g. universal connector is disengaged from the pneumatic tube), the sleeve 21 will be pushed by the elastic restoring member 70 back into a positioning state.

Figure 8:
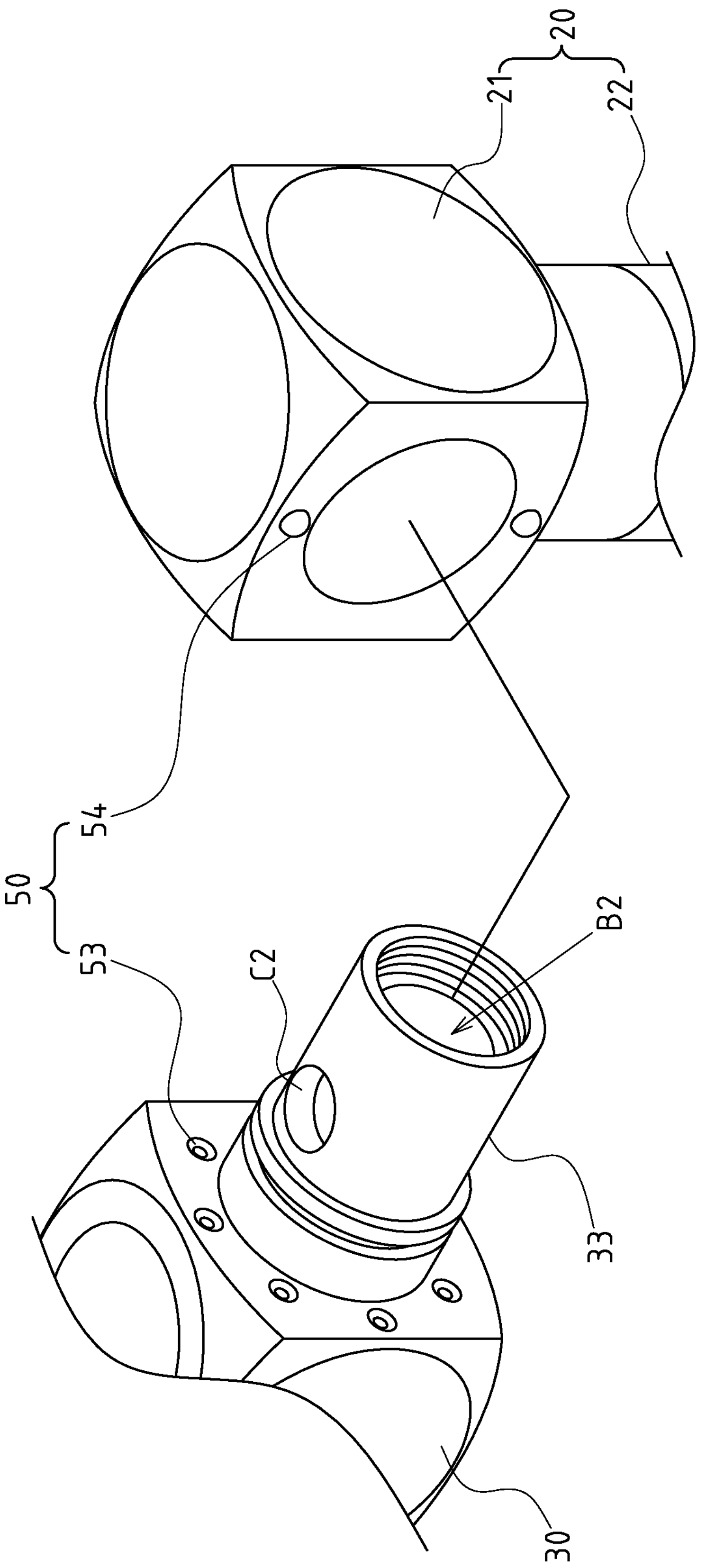
FIG. 8 shows a perspective view of another embodiment of the directional locating member of the present invention.
Figure 9:
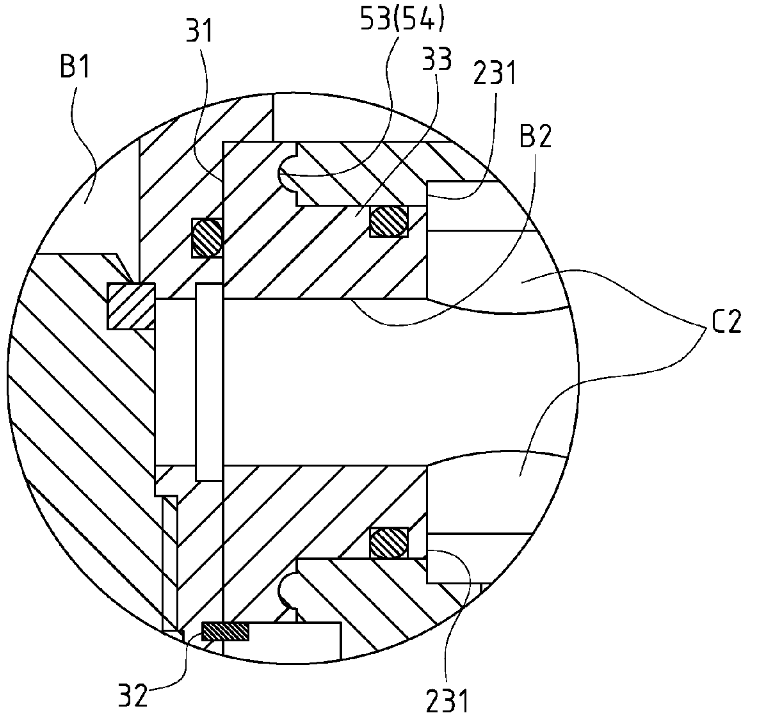
FIG. 9 shows an assembled sectional view of directional locating member disclosed in FIG. 8, which is at a securely positioned state.
Figure 10:
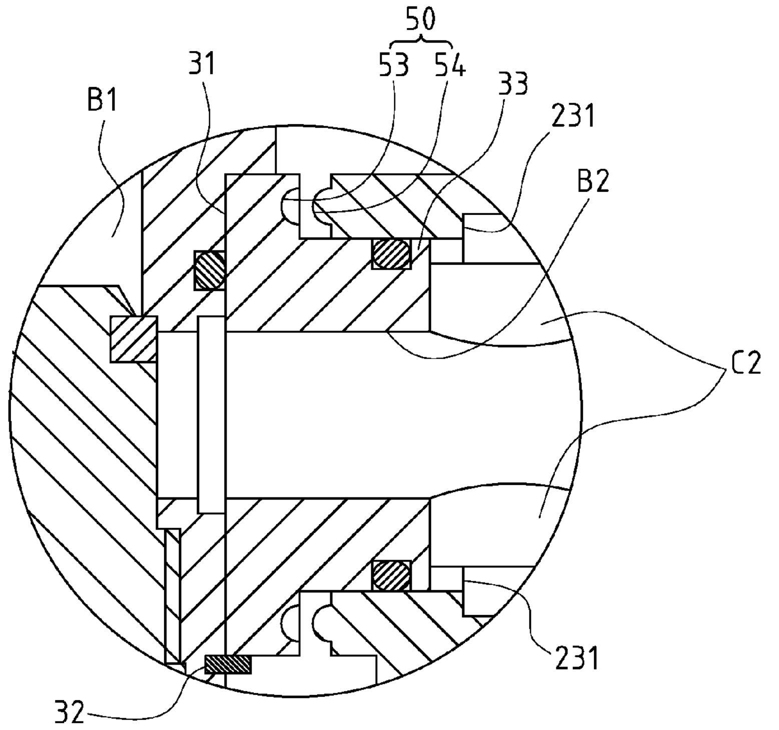
FIG. 10 shows another assembled sectional view of directional locating member disclosed in FIG. 8, which is at a released state.

Referring to FIGS. 8 and 9, the directional locating member 50 may also be comprised of concave and convex portions 53, 54 separately located at the sleeve 21 of the second coupler 20 and opposite pin-joint member 30. The concave portion 53 is arranged at intervals onto one side of the pin-joint member 30 in the form of semicircular grooves, while the convex portion 54 is arranged at one end of the sleeve 21 of second coupler 20 in the form of semicircular granules. As such, the directional positioning of the sleeve 21 of the second coupler 20 can be achieved through embedding of said concave and convex portions 53, 54 (shown in FIG. 9). FIG. 10 depicts the released state of the concave and convex portions 53, 54.

In addition, said directional locating member could also be positioned through a structural model comprising friction surfaces or tip edges.

Figure 11:
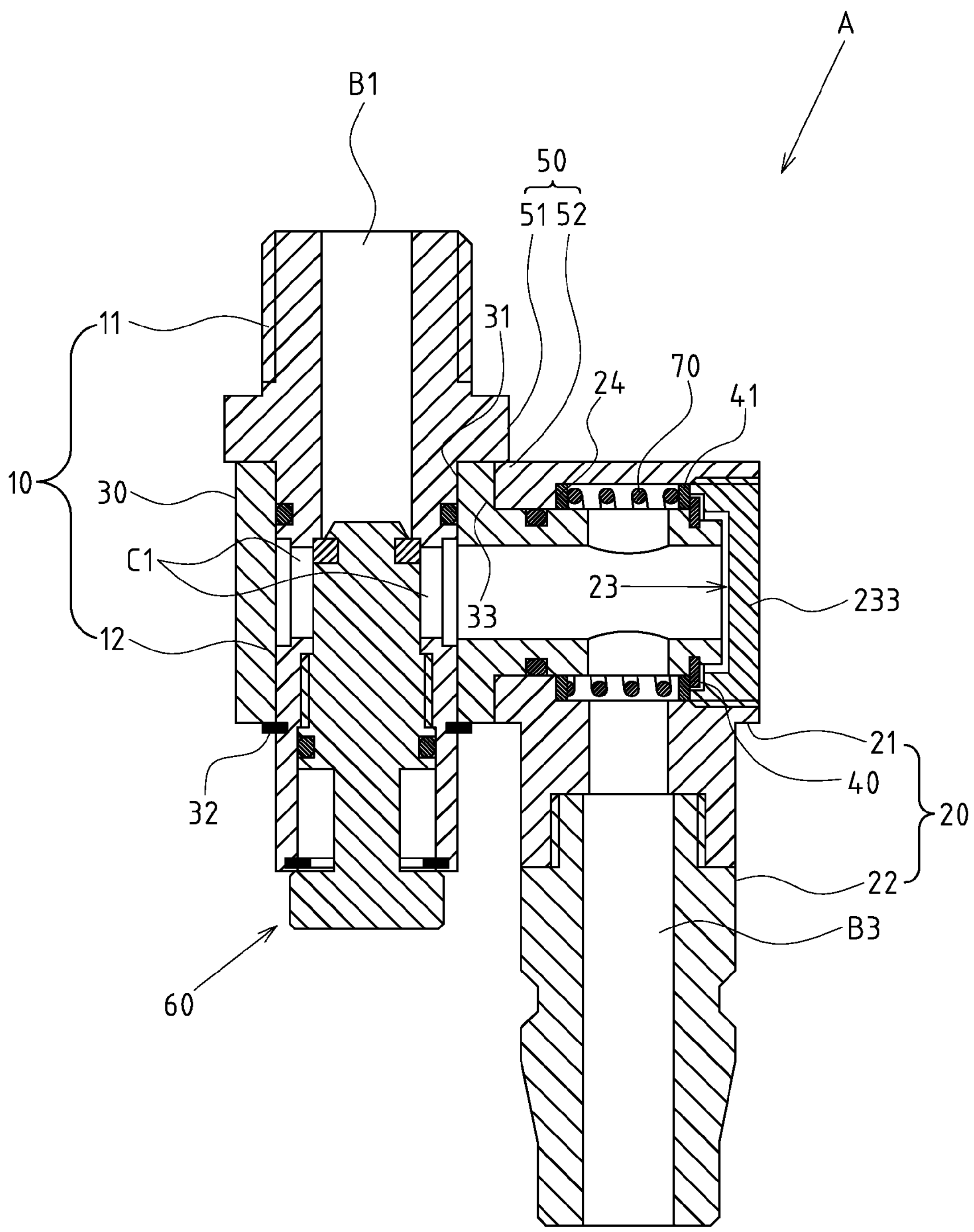
FIG. 11 shows an assembled sectional view of another embodiment of the universal connector of the present invention.
Figure 12:
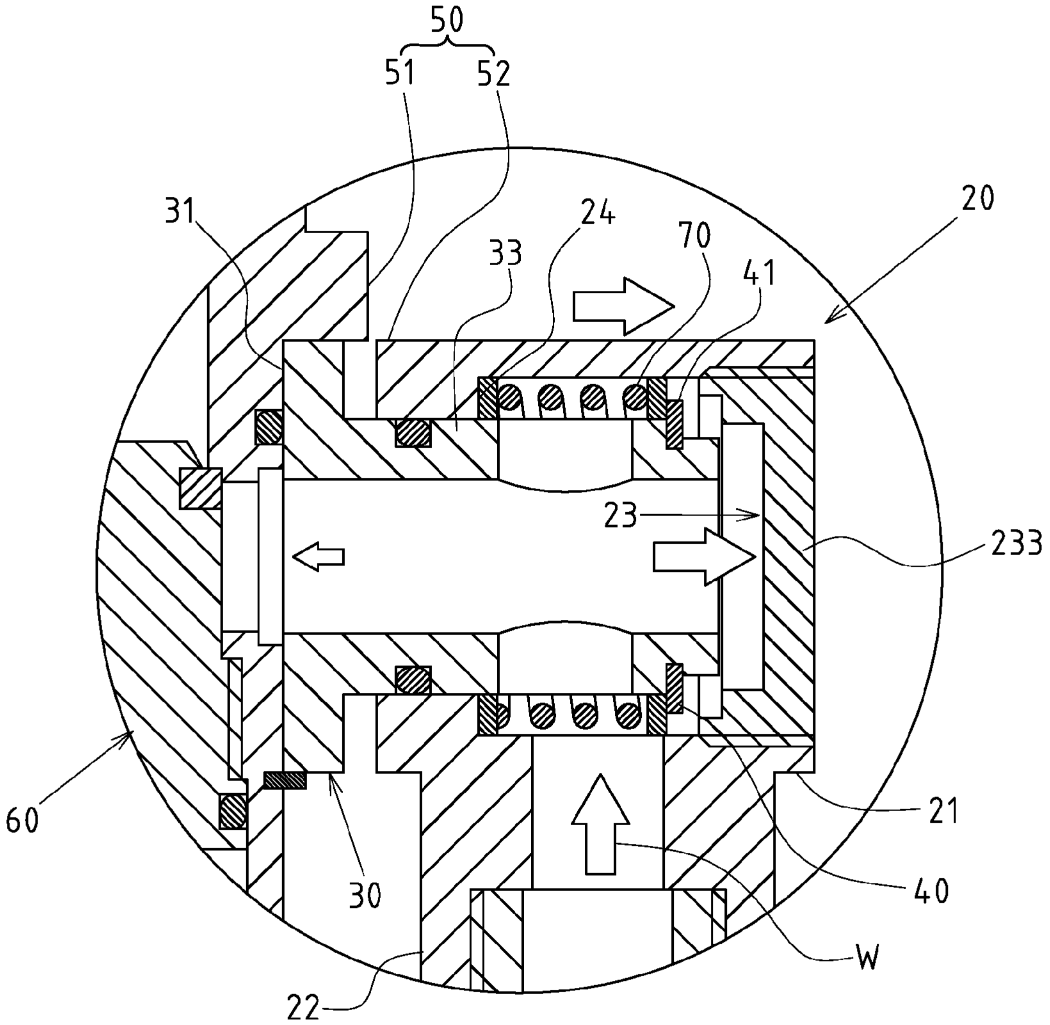
FIG. 12 shows an operational view of the structure disclosed in FIG. 11.

Referring to FIG. 11, the pneumatic pusher 23 of the sleeve 21 may also be formed by the inner surface of the end cover 233 at the terminal of the sleeve 21. Referring to FIG. 12, when air pressure W is inducted, the end cover 233 will be pushed to release the positioning state. Moreover, the preferred embodiment also discloses another positioning member for the sleeve 21 of the second coupler 20, which contains a snap ring 41 at the end of protruding tube 33 of pin-joint member 30. This snap ring 41 is fixed at one end of the elastic restoring member 70, while the other end of the elastic restoring member 70 is fixed onto the shoulder 24 at inner wall of the sleeve 21. During the shift of the sleeve 21, the shoulder 24 will push the elastic restoring member 70 to generate an elastic restoring force, and the snap ring 41 will limit the elastic restoring member 70 to confine the shift of the sleeve 21.

Figure 13:
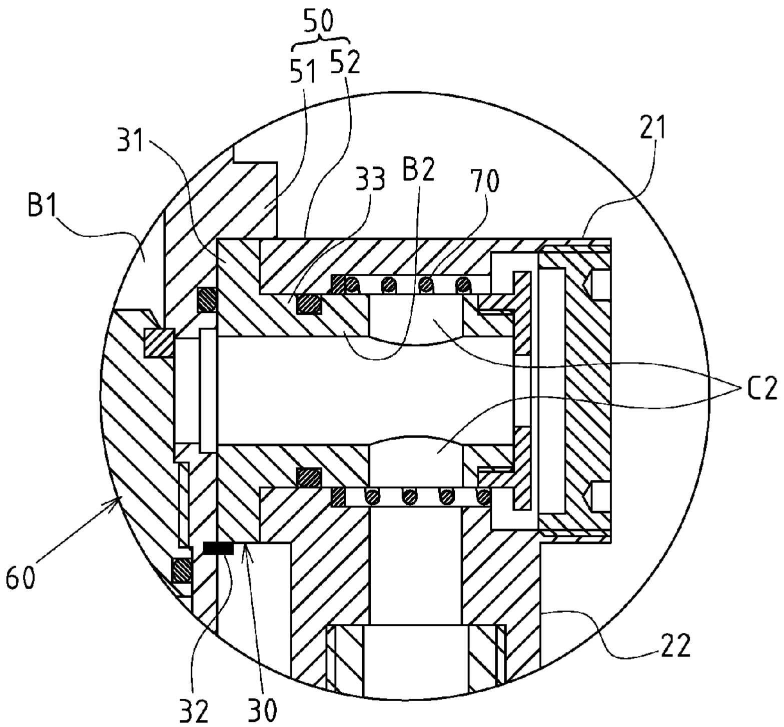
FIG. 13 shows an embodiment of the structure disclosed in FIG. 11.
Figure 14:
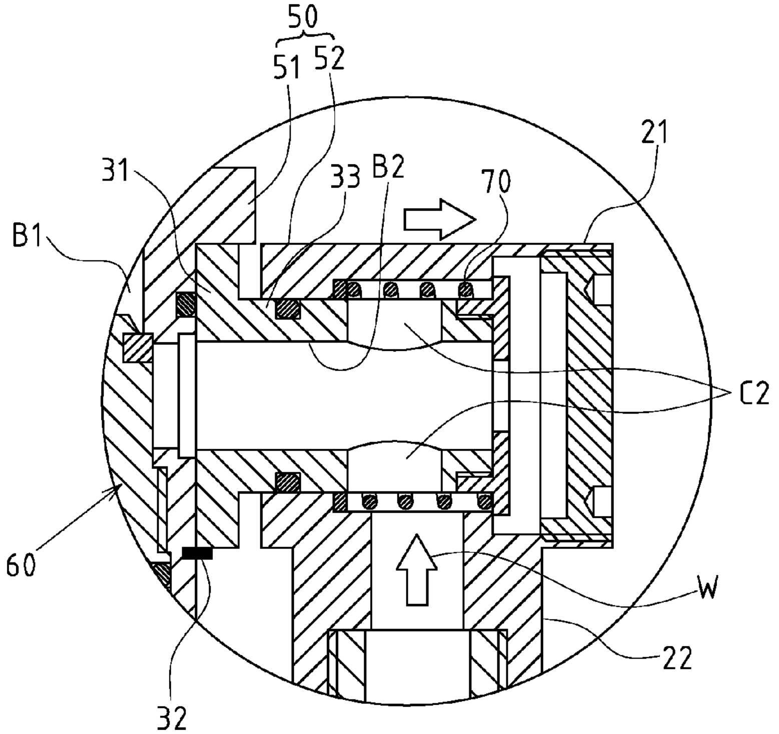
FIG. 14 shows an operational view of the structure disclosed in FIG. 13.

Referring to FIG. 13, the positioning member 40 for the sleeve 21 of second coupler 20 also contains the expanded cover 42 assembled at the end of protruding tube 33 of the pin-joint member 30. The expanded cover 42 is screwed at the end of protruding tube 33, such that a baffle flange 25 on the inner wall of the sleeve 21 could be mated tightly with the expanded cover 42. Referring to FIG. 14, the moving sleeve 21 could be stopped at the expanded cover 42 by the baffle flange 25. The expanded cover 42 is provided with air hole 420 (optionally as a notched groove), such that air pressure W could flow from air hole 420 into the second flow passage B2, thus avoiding any instantaneous blockage of air channel.

Figure 15:
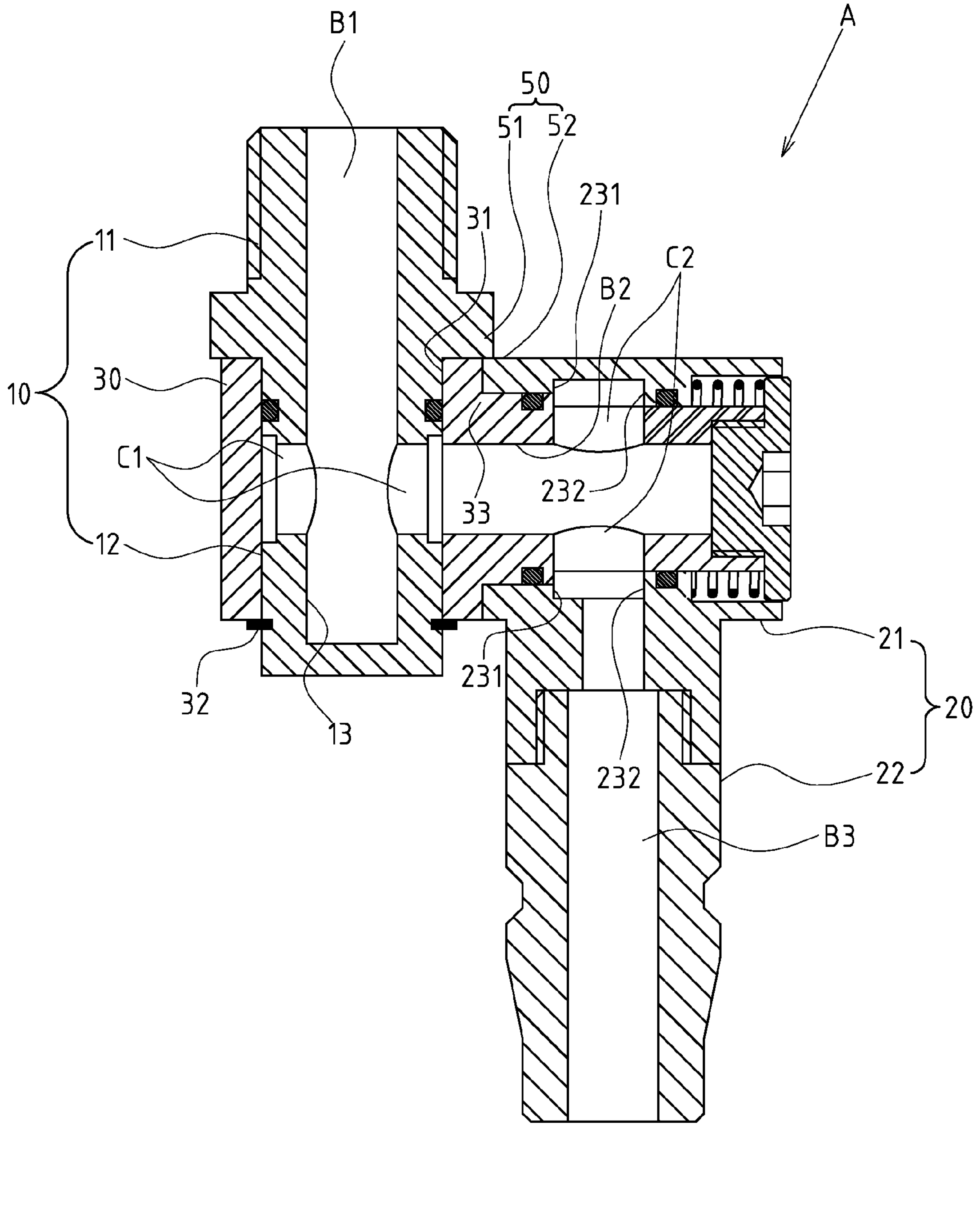
FIG. 15 shows a sectional view of the universal connector of the present invention without pressure-regulating set.

FIG. 15 depicts a sectional view of the universal connector of the present invention without the pressure-regulating set.

Figure 16:
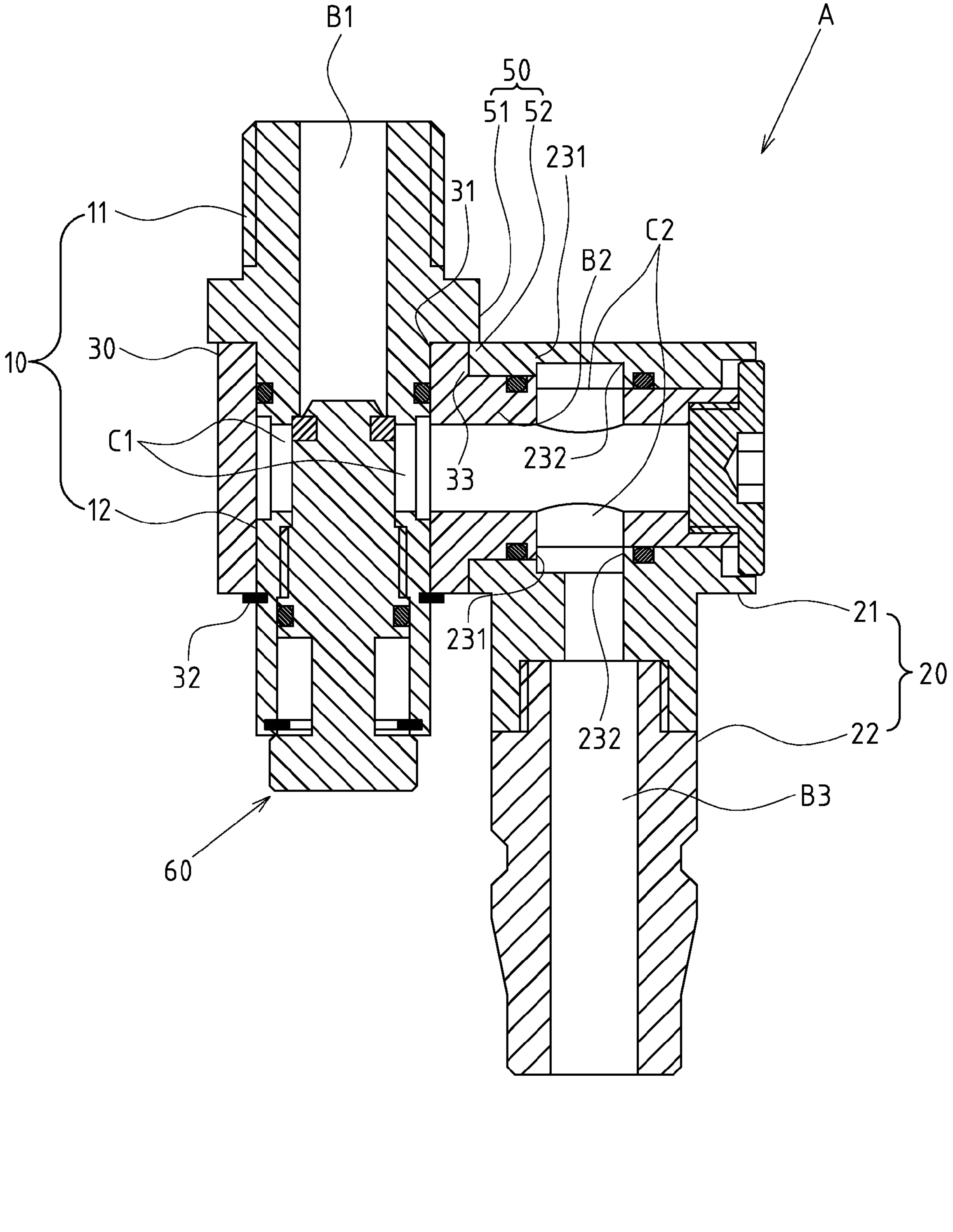
FIG. 16 shows a sectional view of the universal connector of the present invention without elastic restoring member.

FIG. 16 depicts a sectional view of the universal connector of the present invention without the elastic restoring member. In this preferred embodiment, the sleeve 21 must be reset manually after shifting by the pneumatic drive.

We claim:

1. A universal connector for a pneumatic tool with unlocking by air flow, said universal connector comprising:

a first coupler, being hollow and comprising a pneumatic coupling end, an extension end opposite to said pneumatic coupling end, a first flow passage within said first coupler; and a first air hole linked to said first flow passage set on a wall of said extension end;

a pin-joint member having one end provided with a through-hole screwed onto said extension end of said first coupler, a locating element employed to limit a relative position of said through-hole and said extension end, a protruding tube arranged at one side of said pin-joint member, and a second flow passage formed within said protruding tube, one end of said second flow passage being linked to said through-hole, and then to said first air hole of said extension end of said first coupler, said pin-joint member having a second air hole linked to said second flow passage set on a wall of said protruding tube;

a second coupler having one end comprised of a sleeve screwed into said protruding tube of said pin-joint member, a positioning member employed to limit a relative position of said sleeve and said protruding tube, and another end of said second coupler provided with a coupling portion, forming a third flow passage;

wherein one end of said third flow passage is linked to said sleeve and to said second air hole of said protruding tube of said pin-joint member; and wherein said sleeve of said second coupler shifts along a predefined path of said protruding tube of said pin-joint member, forming flexibly first and second positions, said sleeve being provided with a pneumatic pusher, said sleeve being driven to shift from the first position to the second position; and a directional locating member limiting rotation of said sleeve as said sleeve is located at the first position, said directional locating member being mounted between said sleeve and said first coupler, or said pin-joint member.

2. The universal connector defined in claim 1, further comprising:

a hold tank being placed within said extension end of said first coupler away from said pneumatic coupling end and having a pressure-regulating set therein, said pressure-regulating set being comprised of a movable main body, said main body having one end provided with a sealing portion to control switching and flow rate between said first flow passage and said first air hole and another end of said main body provided with a controlling portion protruding from the extension end, controlling shift of said main body.

3. The universal connector defined in claim 1, further comprising:

an elastic restoring member, enabling said sleeve of said second coupler to be reset automatically from the second position to the first position when air pressure is released.

4. The universal connector defined in claim 1, wherein said positioning member for said sleeve of said second coupler contains an expanded cover or snap ring assembled at an end of said protruding tube of said pin-joint member.

5. The universal connector defined in claim 4, wherein said expanded cover is provided with air hole.

6. The universal connector defined in claim 1, wherein said pneumatic pusher for said sleeve is comprised of non-isometric radial ring surfaces formed on an inner wall of said sleeve.

7. The universal connector defined in claim 1, wherein said pneumatic pusher of said sleeve is formed by an inner surface of an end cover at a terminal end of said sleeve.

8. The universal connector defined in claim 1, wherein said directional locating member is comprised of a flanged portion on said first coupler and a flush portion opposite to said sleeve of said second coupler, said sleeve being located at the first position, the rotational behavior being securely locked, if said flanged portion of said first coupler is pressed on said flush portion of said sleeve.

9. The universal connector defined in claim 1, wherein said directional locating member is comprised of concave and convex portions separately located at said sleeve and opposite said pin-joint member, or comprised of friction surfaces or tip edges.

* * * * *